(12) United States Patent
O'Meagher

(10) Patent No.: US 7,480,511 B2
(45) Date of Patent: Jan. 20, 2009

(54) METHOD AND SYSTEM FOR DELIVERING VIRTUAL REFERENCE STATION DATA

(75) Inventor: Brent O'Meagher, Auckland (NZ)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 10/666,079

(22) Filed: Sep. 19, 2003

(65) Prior Publication Data

US 2005/0064878 A1    Mar. 24, 2005

(51) Int. Cl.
*H04Q 7/20* (2006.01)

(52) U.S. Cl. ............... 455/456.1; 455/421; 455/422.1; 455/432.1; 455/427; 455/41.2

(58) Field of Classification Search ............ 701/214, 701/215; 455/456, 456.1, 421, 422.1, 432.1, 455/427, 41.2, 15; 346/449
See application file for complete search history.

(56) References Cited

U.S. PATENT DOCUMENTS

| | | | |
|---|---|---|---|
| 5,729,826 A * | 3/1998 | Gavrilovich | ............ 455/11.1 |
| 6,324,473 B1 | 11/2001 | Eschenbach | |
| 6,397,147 B1 | 5/2002 | Whitehead | |
| 6,469,663 B1 | 10/2002 | Whitehead et al. | |
| 6,473,032 B1 | 10/2002 | Trimble | |
| 6,567,041 B1 | 5/2003 | O'Dell | |
| 2002/0198657 A1* | 12/2002 | Robbins | ............ 701/214 |
| 2004/0029558 A1* | 2/2004 | Liu | ............ 455/404.2 |
| 2004/0151152 A1 | 8/2004 | Kim et al. | |

FOREIGN PATENT DOCUMENTS

WO    WO 01/50151 A1 *    1/2001

OTHER PUBLICATIONS

Landau H. et al: "Virtual Reference Station Systems" Journal of Global Positioning Systems, vol. 1, No. 2, 2002, pp. 137-143.
Talbot N. et. al: "Broadcast Network RTK-Transmission Standards and Results" ION GPS, Sep. 24-27, 2002, pp. 2379-2387.

* cited by examiner

*Primary Examiner*—Lester G. Kincaid
*Assistant Examiner*—Charles Shedrick

(57) ABSTRACT

The present invention is a method and system for determining a geographic position. In one embodiment, a data message comprising pseudorange data for a designated location and pseudorange corrections for a designated region surrounding the designated location is created. The data message is sent via a cellular telephone connection to a base station located in the designated region. The data message is then transmitted from the base station to a mobile position determination unit using a radio transmitter.

30 Claims, 9 Drawing Sheets

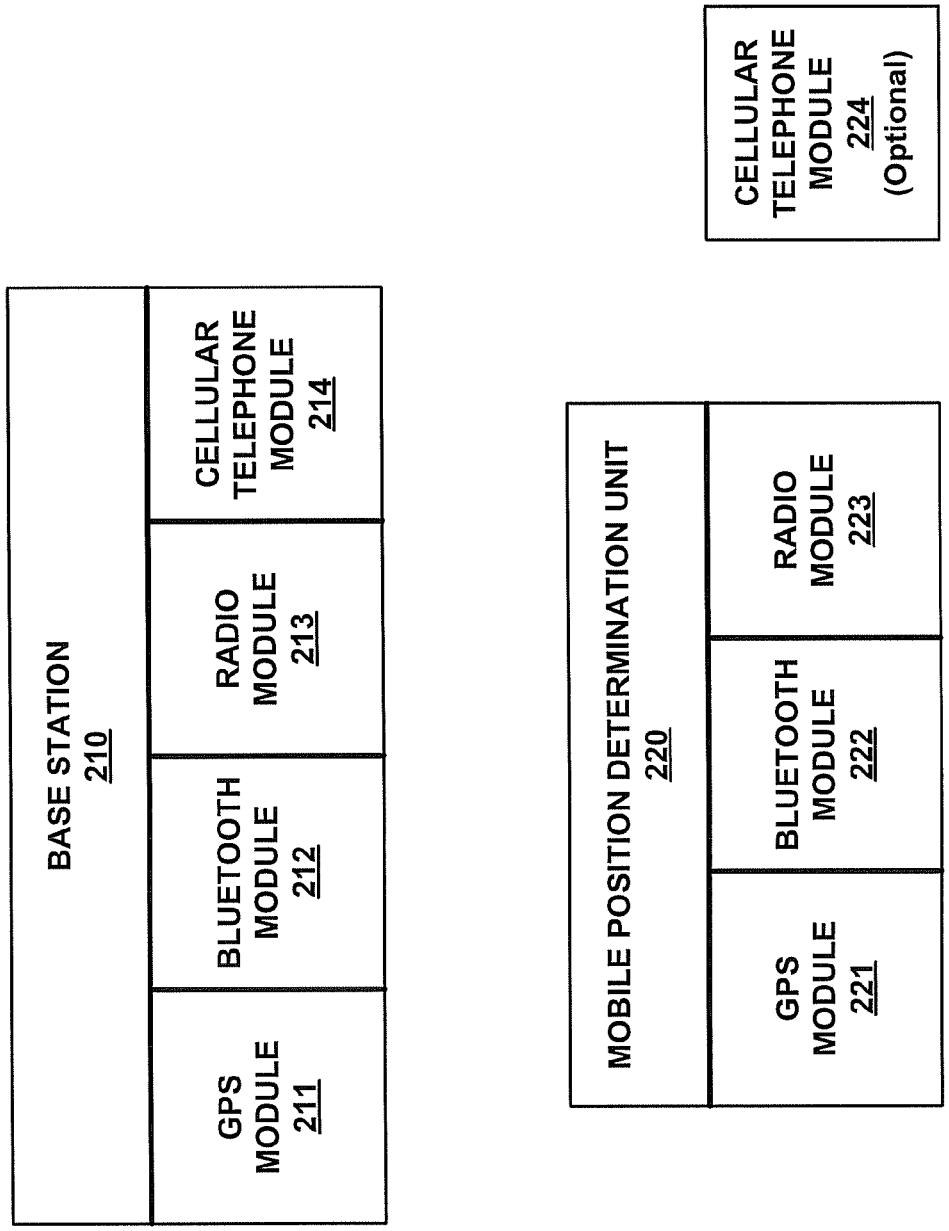

200

BASE STATION 210
| BLUETOOTH MODULE 212 (Optional) | RADIO MODULE 213 | CELLULAR TELEPHONE MODULE 214 |

MOBILE POSITION DETERMINATION UNIT 220
| GPS MODULE 221 | BLUETOOTH MODULE 222 (Optional) | RADIO MODULE 223 |

CELLULAR TELEPHONE MODULE 224 (Optional)

FIG. 2C

METHOD AND SYSTEM FOR DELIVERING VIRTUAL REFERENCE STATION DATA

FIELD OF THE INVENTION

The present invention relates to position determining systems. More specifically, the present invention relates to a broadcast network for determining a geographic position.

BACKGROUND OF THE INVENTION

Real-Time Kinematics (RTK) refers to a surveying system and method which uses two GPS receivers and a communications link between them to determine a position of one receiver relative to the other receiver. In a typical RTK survey system, a first GPS receiver is located at a known position, often a surveyor's landmark or benchmark, or an otherwise surveyed position, and the pseudorange data it collects is sent to the second GPS receiver, often referred to as a "rover," via a radio communications link. The rover is used to determine the relative position of desired points according to the needs of the survey effort. Thus there is a radio transmitter associated with the first receiver, called a reference receiver or a base station receiver, and a radio receiver at the rover. Pseudorange data from the satellites in view from the first receiver at the base station location is combined with data taken at the second rover receiver, and is processed at the rover according to well-known RTK methods to develop a position of the rover relative to the base station position. The typical distance from base to rover for acceptable accuracy is in the range of 15-30 Km. The errors are due to atmospheric variations which in turn cause changes in the measured path length to the satellites (pseudoranges). Thus for surveying or other positioning systems which must work over larger regions, the surveyor must either place additional base stations in the regions of interest, or move his base stations from place to place. This range limitation has led to the development of more complex enhancements that have superceded the normal RTK operations described above, and in some cases eliminated the need for a base station GPS receiver altogether. This enhancement is referred to as the "Virtual Reference Station" system and method. It is also referred to as Networked RTK.

Network RTK typically uses three or more GPS reference stations to collect GPS data and extract information about the atmospheric and satellite ephemeris errors affecting signals within the network coverage region. Data from all the various reference stations is transmitted to a central processing facility, or VRS control center for Network RTK. Suitable software at the control center processes the reference station data to infer how atmospheric and/or satellite ephemeris errors vary over the region covered by the network. The control center computer processor then applies a process which interpolates the atmospheric and/or satellite ephemeris errors at any given point within the network coverage area and generates a pseudorange correction comprising the actual pseudoranges that would be received at the specified base station location, now referred to as the Virtual Reference Station, and pseudorange corrections applicable to the region surrounding that location. As in the basic RTK method, where the pseudoranges measured at the base station are delivered to the rover via a radio link, so must the corrected pseudoranges calculated at the VRS control center be delivered to the rover, or rovers doing the actual surveying. Since the VRS control center can be located anywhere, it is not likely to be within normal radio transmission range of the rovers. Typically, prior art delivery methods included using a direct cellular connection between the VRS control center and each rover.

As VRS methods have been accepted and have become widely used, more and more rovers are employed in a survey, the necessity of a dedicated direct connection for each rover has emerged as a financial burden and therefore a limitation of the VRS system. For example, a construction site may have a plurality of roving GPS units working at the same time, each with a dedicated cellular connection to the control center. Additional GPS receivers may be used with construction equipment to, for example, dig a trench for utility lines in an exact location, or grade a road in a particular location. Thus, a plurality of cellular connections may be needed within a relatively compact area for each GPS receiver being used.

Current methods for delivering VRS data to roving mobile position determination units are inadequate. Accordingly, a need exists for a VRS data distribution system and method that reduces the need for dedicated cellular telephone connections between the various rovers and a distant VRS control center.

SUMMARY OF THE INVENTION

The present invention is a method and system for delivering network created correction data as part of a Virtual Reference Station activity to a multiplicity of rovers via a concatenated communications link consisting of a single cellular connection, and a radio transmission or broadcasting system. In one embodiment, the location of the radio transmitting system is co-located with a GPS base station that is designated as the position of the local Virtual Reference Station. This GPS base station determines its position using GPS, informs the VRS base station of its location via a cellular link between the local GPS base station and the VRS base station, whereupon the VRS base station generates corrections as if such corrections were actually being generated at the GPS base station. A message, comprising a VRS corrected pseudorange for a specified VRS base station location, is then transmitted via a cellular telephone network to the radio transmitting (broadcasting) system at the designated VRS position, at the GPS base station. The radio transmitter at the GPS base station sends the position correction wirelessly to a rover mobile position determination unit which uses the position correction information to calculate its present location as part of an overall position determining process. The rover position information developed and stored with VRS corrections is much more accurate than an uncorrected GPS position.

Embodiments of the present invention can be used to determine a geographic position with a level of resolution that is comparable with other existing RTK systems. Because the base station need only be known to a lower level of accuracy, it is not necessary to position it at a surveyed position, such as a benchmark. The position of the virtual reference station will be determined to higher level of accuracy by the VRS control center. Additionally, there is no need for a dedicated cellular connection from the VRS base station to each roving GPS unit in the field. The base station at the designated Virtual Reference Station location can wirelessly forward the VRS pseudoranges and corrections it receives via the cellular telephone network to the roving GPS units using, for example, a radio transmitter or transceiver. In one embodiment, the base station can be used as a rover as well as the base station for other roving GPS units in the vicinity.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIGS. 2A, 2B, and 2C are block diagrams of embodiments of exemplary devices used in a system for delivering Virtual Reference Station data in accordance with embodiments of the present invention.

DETAILED DESCRIPTION OF THE PREFERRED EMBODIMENTS

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
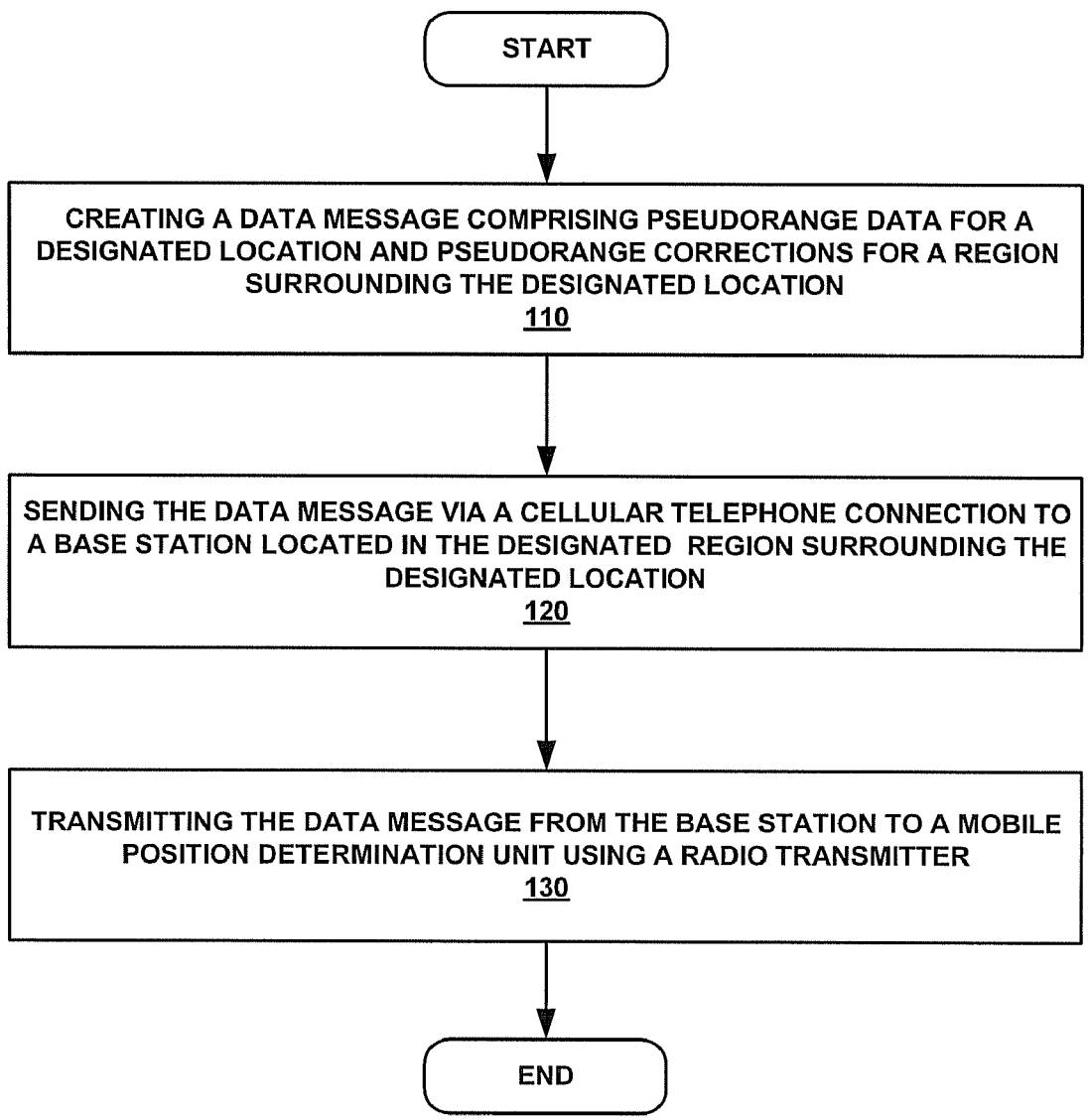
FIG. 1 is a flowchart of a method for delivering Virtual Reference Station data accordance with embodiments of the present invention.

FIG. 1 is a flowchart of a method 100 for delivering Virtual Reference Station data in accordance with embodiments of the present invention. For clarity, the following discussion will refer to FIGS. 2A, 2B, and 2C as well as FIG. 3 to explain embodiments of the present invention. In step 110 of FIG. 1, a data message is created comprising pseudorange data derived for a designated location and pseudorange corrections for a region surrounding the designated location. In embodiments of the present invention, a Virtual Reference Station network is used to collect GPS data and extract information about the atmospheric and satellite ephemeris errors affecting signals within the network coverage region. Data from various reference stations in the network is transmitted to a central processing facility, or VRS control center for Network RTK. Suitable software at the VRS control center processes the reference station data to infer how atmospheric and/or satellite ephemeris errors vary over the region covered by the network. The VRS control center computer processor then applies a process which interpolates the atmospheric and/or satellite ephemeris errors at any given point within the VRS network coverage area and generates a pseudorange correction comprising the actual pseudoranges that would be received at a designated location in the network coverage area. The VRS control center also generates pseudorange corrections applicable to a designated region surrounding the designated location.

In step 120 of FIG. 1, the data message of step 110 is sent via a cellular telephone connection between the VRS control station and a base station located in a designated region surrounding the designated location. As in the basic RTK method, wherein the pseudoranges measured at a base station are delivered to a rover via a radio link, so must the corrected pseudoranges calculated at the VRS control center be delivered to the base station located at a designated location, or within a designated region surrounding the designated location. In embodiments of the present invention, the data message is sent from the VRS control center to the base station via a cellular telephone network. In embodiments of the present invention, the designated location of the base station is determined using a Geographic Positioning System (GPS) receiver located proximate to the base station. For example, the base station may be a Real-time Kinematics (RTK) base station comprising a GPS receiver and communications devices. The GPS receiver of the base station can be used to derive an initial position fix of the designated location. In another embodiment, the mobile position determination unit comprises a GPS receiver and is located proximate to the base station. The GPS receiver of the mobile position determination unit can be used to derive an initial position fix of the designated location for the base station.

In step 130 of FIG. 1, the data message is transmitted from the base station to a mobile position determination unit using a radio transmitter. In embodiments of the present invention, the pseudorange data derived for the designated location and the pseudorange corrections for a designated region surrounding the designated location are sent to at least one mobile position determination unit via the base station. In accordance with embodiments of the present invention, the data message is sent from the base station to the mobile position determination unit using a radio transmitter.

Embodiments of the present are advantageous over conventional VRS networks and methods because dedicated cellular telephone connections between each mobile position determination unit and the VRS control center are not necessitated in embodiments of the present invention. The need for a dedicated cellular connection for each mobile position determination unit is financially burdensome and is needlessly redundant when a plurality of mobile position determination units are being used in a relatively compact region surrounding the base station. In embodiments of the present invention, only a single cellular telephone connection, between the VRS control center and the base station, is necessary to send the pseudorange corrections and the derived pseudorange data. This data is then forwarded to the mobile position determination units using a radio transmitter located at the designated location.

Figure 2B:
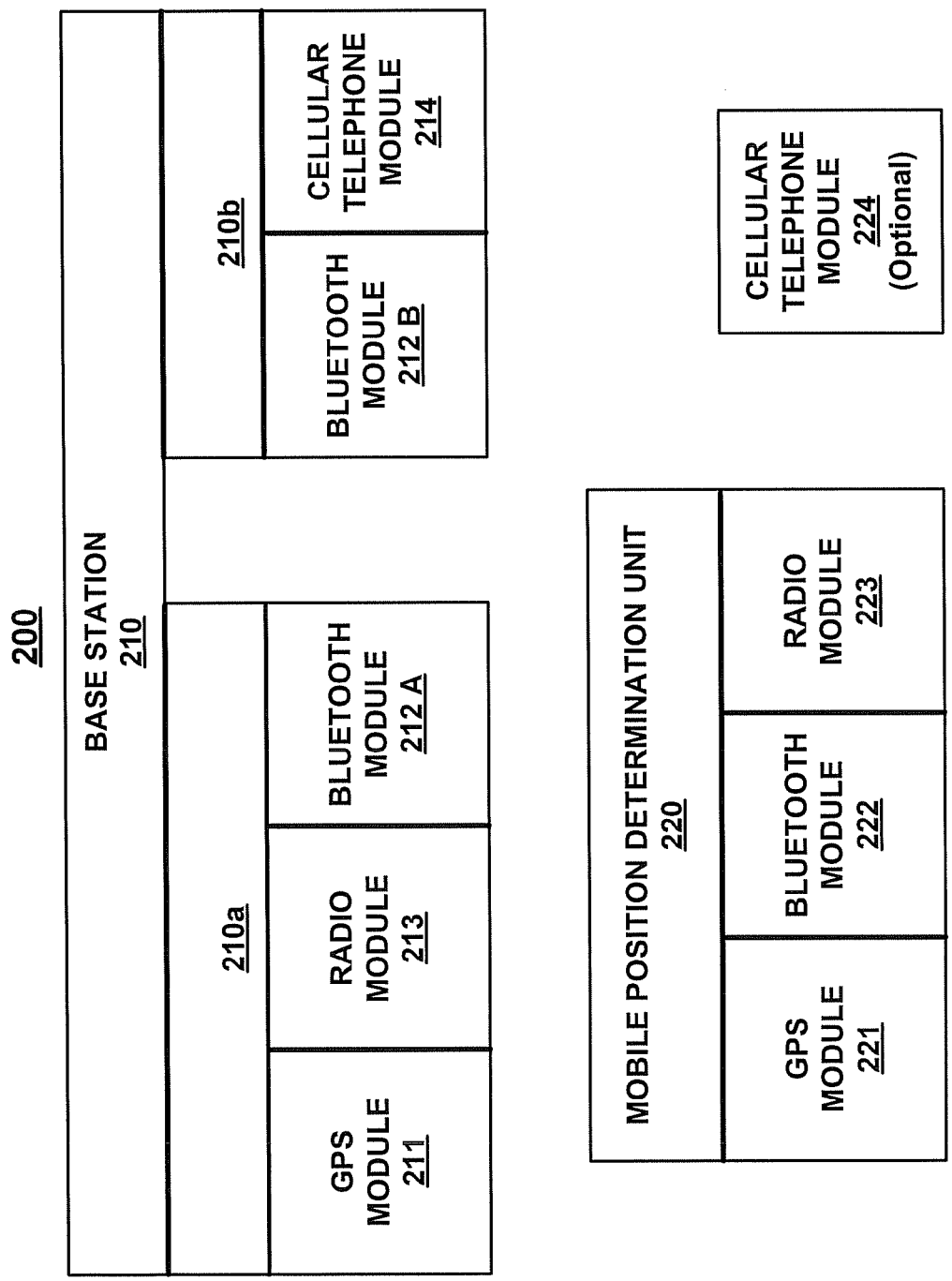

FIGS. 2A, 2B, and 2C are block diagrams of embodiments of exemplary base stations and mobile position determination units used in a system 200 for delivering virtual reference station data in accordance with embodiments of the present invention. While the following embodiments of system 200 are recited specifically, it is appreciated that the present invention is not limited to these embodiments alone. In FIG. 2A, base station 210 comprises a GPS module 211, a Bluetooth module 212, a radio module 213, and a cellular telephone module 214. While the present invention recites a GPS module specifically, embodiments of the present invention are well suited to utilize other navigational systems such as the GLONASS system, or the Galileo system currently under development.

Mobile position determination unit 220 comprises a GPS module 221, a Bluetooth module 222, and a radio module 223. Mobile position determination unit 220 may also comprise optional cellular telephone module 224 either integrated into unit 220 or, for example, carried by an operator (e.g., a cell phone). Other components of base station 210 and mobile position determination unit 220 that are not shown can include a processor for processing digital information, data storage devices such as memory, magnetic or optical storage, and/or removable data storage devices. Additionally, antennas for the various communication devices are not shown for clarity.

In the embodiment of FIG. 2A, an initial location of base station 210 can be determined using GPS module 211. In other words, an initial position fix of the designated location of base station 210 is determined using GPS module 211. Alternatively, the initial location of base station 210 can be determined using GPS module 221 of mobile position determination unit 220. This initial location is then transmitted to the VRS control center via a cellular telephone network using, for example, cellular telephone module 214. VRS control center 310 determines the expected pseudoranges for base station 210 by, suitable processing of the pseudoranges obtained from the various distant reference stations in the VRS network. The pseudorange data is then sent to base station 210 via the cellular telephone network. For example, an un-aided GPS unit can fix its current position with a resolution of approximately 10 meters. However, when the pseudorange data from VRS control center 310 is correlated with the initial position fix, a resolution of 1 centimeter over 10 kilometers is realized in the horizontal plane, and 2 centimeters over 10 kilometers is realized in the vertical plane is realized.

As long as base station 210 remains within a designated region surrounding the designated location the VRS base station will continue to send pseudorange data and pseudorange corrections based upon the initial designated position. If base station 210 is moved outside of the designated region, a new set of pseudorange data and pseudorange corrections may be determined using VRS network 300.

In FIG. 2B, base station 210 comprises two separate units. The first-unit 210a comprises a GPS module 211, a radio module 213, and a first Bluetooth module 212a. The second unit 210b comprises a second Bluetooth module 212b and a cellular telephone module 214. Mobile position determination unit 220 comprises GPS module 221, Bluetooth module 222, radio module 223 and optional cellular telephone module 224. In the embodiment of FIG. 2B, the initial location of base station 210 can be determined using GPS module 211 of first unit 210a. Alternatively, the initial location of base station 210 can be determined using GPS module 221 of mobile position determination unit 220. In one embodiment, this initial location is sent from first unit 210a to second unit 210b wirelessly via Bluetooth modules 212a and 212b. However, while the present embodiment recites sending the initial location to second unit 210b wirelessly, embodiments of the present invention are well suited for sending the initial location from first unit 210a to second unit 210b using other methods such as a parallel or serial data connection. Additionally, embodiments of the present invention are well suited to using other wireless communications such as radio transceivers for sending the initial location from first unit 210a to second unit 210b. Second unit 210b sends the initial location to the VRS control center via a cellular telephone network using cellular telephone module 214. The pseudorange data of the designated location of base station 210 is then determined as described above.

In FIG. 2C, base station 210 comprises a radio module 213, a cellular telephone module 214, and an optional Bluetooth module 212. Mobile position determination unit 220 comprises GPS module 221, radio module 223, an optional Bluetooth module 212, and an optional cellular telephone module 224. In the embodiment of FIG. 2C, the initial location of base station 210 is determined using the GPS module 221 of mobile position determination unit 220. For example, position determining 220 unit can be located proximate to base station 210 and the initial location for base station 210 is determined using GPS module 221. The initial location can be sent wirelessly to base station 210 using either Bluetooth module 222, radio module 223, or cellular telephone module 224. While the present embodiment recites mobile position determination unit 220 sending the initial location to base station 210 wirelessly, embodiments of the present invention are well suited to using other communication methods such as a serial or parallel data connection, etc. Base station 210 receives the initial location using radio module 213, Bluetooth module 212, or cellular telephone module 214 and sends it to VRS control center 310 via a cellular telephone network connection using cellular telephone module 214. The pseudorange data of the designated location of base station 210 is then determined as described above as well as the pseudorange corrections for the designated region surrounding the designated location of base station 210.

Figure 3:
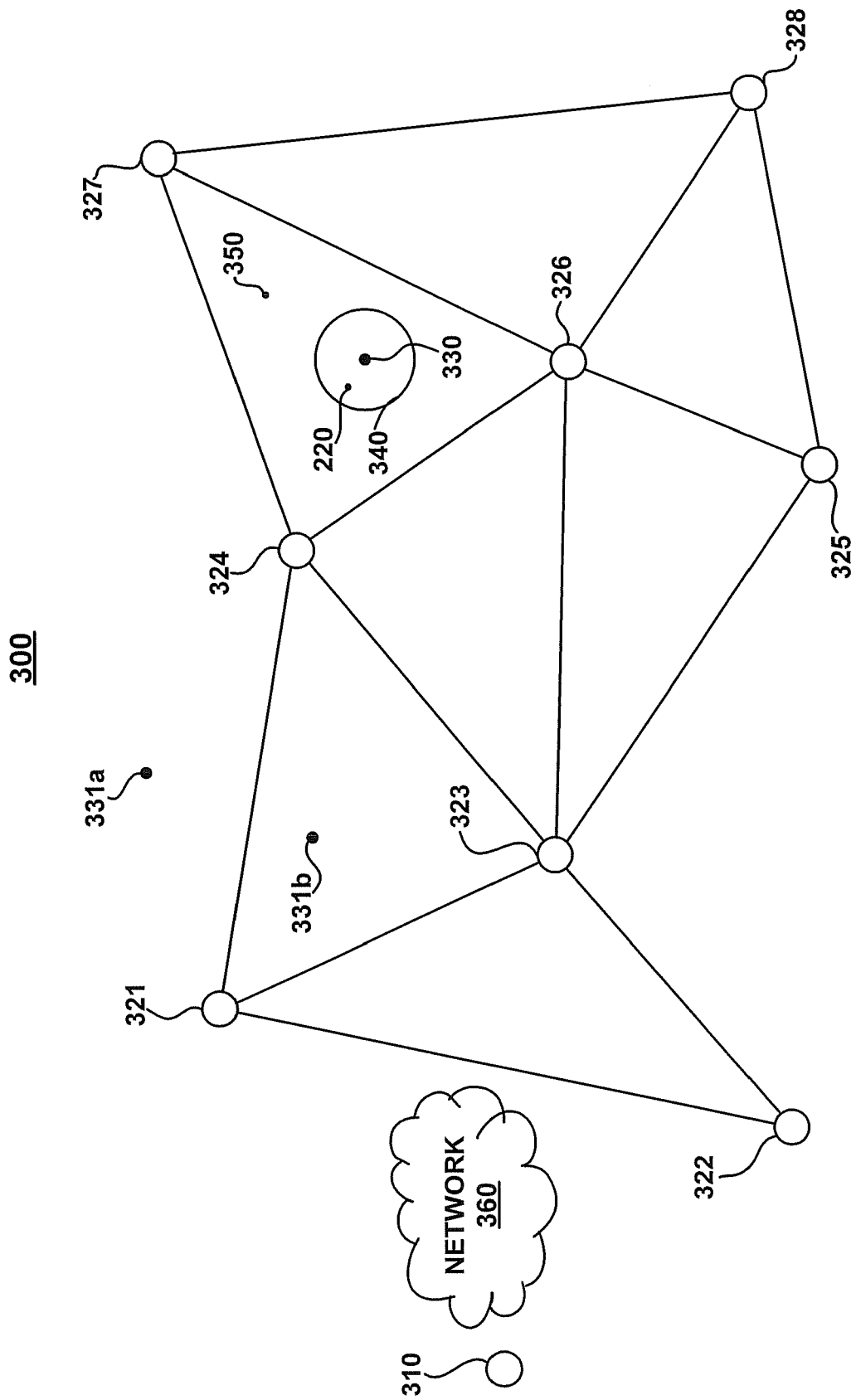
FIG. 3 is a diagram showing an exemplary system for determining a geographic position in accordance with embodiments of the present invention.

Referring now to FIG. 3, which shows an exemplary broadcast network 300 which can be utilized in embodiments of the present invention. In one embodiment, network 300 is a VRS network comprising a VRS control center 310 that is communicatively coupled with a plurality of reference stations (e.g., reference stations 321, 322, 323, 324, 325, 326, 327, and 328 of FIG. 3). In embodiments of the present invention, there are a variety of methods for communicatively coupling VRS control center 310 with reference stations 321-328 such as wireless transmissions, or a Public Switched Telephone Network (PSTN).

The reference stations are located at surveyed positions and are used to establish the magnitude of position fix errors (e.g., ionospheric and tropospheric delay, satellite orbit errors, satellite clock errors, etc.) incurred at that location when receiving a satellite based position fix such as a GPS position fix. As a result of these errors, a GPS receiver may provide an inaccurate position fix. However, comparing the position fix from the GPS receiver with the surveyed position of the reference station facilitates establishing the magnitude of the position fix error at that location. A pseudorange correction can then be derived which, when correlated with the position fix, accurately determines the initial position of the GPS receiver. In embodiments of the present invention, this then becomes the designated location of the Virtual Reference Station.

In embodiments of the present invention, other processes are typically used to provide further corrections, as described in an article titled "Broadcast Network RTK Transmission Standards and Results," by Nicholas Talbot, Gang Lu, Timo Allison, and Ulrich Vollath, and incorporated as reference herein in its entirety can be accessed at the following URL: http://tri.trimble.com/dscgi/ds.py/Get/File-110017/Broadcast_Network_RTK.pdf.

Another article describing Virtual Reference Station processing titled, "Multi-Base RTK Positioning Using Virtual Reference Stations," by Ulrich Vollath, Alois Buecherl, Herbert Landau, Christian Pagels, and Bernhard Wagner, and incorporated as reference herein in its entirety can be accessed at the following URL: http://trl.trimble.com/dscgi/ds.py/Get/File-93153/ION2000-Paper-MultiBase.doc.

An additional article describing VRS processing titled, "Long-Range RTK Positioning Using Virtual Reference Stations," by Ulrich Vollath, Alois Deking, Herbert Landau, and Christian Pagels, and incorporated as reference herein in its entirety can be accessed at the following URL: http:H/trl.t-rimble.com/dscgi/ds.py/Get/File-93152/KIS2001-Paper-LongRange.pdf.

Determining the pseudorange data for the designated location and the pseudorange corrections is typically performed at VRS control center 310. Using the data from the various other reference stations, VRScontrol center 310 can then mathematically determine the appropriate corrections for pseudoranges measured by rovers at a given location in the coverage region of network 300. For example, VRS control center 310 can calculate pseudorange corrections for a navigation receiver 331a using the information sent by reference stations 321 and 324. Similarly, VRS base station/control center 310 can calculate pseudorange corrections for a navigation receiver 331b using the error information sent by reference stations 321, 323, and 324.

In the present embodiment, the designated location (e.g., location 330 of FIG. 3) of a VRS base station (e.g., base station 210) is determined using VRS network 300. In one embodiment, a GPS position fix of the initial position of base station 210 is determined and sent to VRS control center 310 using, for example, cellular network 360. VRS control center 310 then determines expected pseudoranges and corrections for pseudoranges in that region for base station 210 using the data generated by reference stations in the vicinity (e.g., reference stations 324, 326, and 327).

Referring again to step 120 of FIG. 1, a data message is sent from VRS control center 310 to base station 210 comprising the pseudorange data for GPS receivers at the designated location 330 and pseudorange corrections for a designated region surrounding location 330 (e.g., region 340 of FIG. 3) via cellular network 360.

Referring again to step 130 of FIG. 1, the data message containing the expected pseudoranges and pseudorange corrections appropriate for this region is sent from the base station 210 to a mobile position determination unit using a radio transmitter (e.g., radio module 231 of FIGS. 2A, 2B, and 2C). The pseudorange and correction data can then be used to determine the position of a roving mobile position determination unit 220. As long as mobile position determination unit 220 is within a designated region surrounding the designated location of the virtual reference station (e.g., within region 340 of FIG. 3) of base station 210, the pseudorange data and pseudorange corrections received by base station 210 in step 120 can be used to determine the current position of mobile position determination unit 220 using standard RTK methods.

Since pseudorange data is taken and processed second by second, the data stream from the VRS control center must be delivered in real time, for the duration of the survey by the mobile position determination units. This method of delivering all necessary data to a single point for redistribution via alternate, less expensive communications channels represents a large potential savings for surveyors. For example, at a construction site it is not uncommon to find multiple mobile position determination units used for surveying purposes in addition to multiple mobile position determination units being used in conjunction with heavy machinery such as bulldozers and back-hoes. All of these units may be able to utilize the same pseudorange correction from the VRS base station if they are within a given radius of the virtual reference station.

Embodiments of the present invention reduce the need for multiple cellular telephone connections because the base station sends the position correction to mobile position determination units using, for example, the Bluetooth module 212, or the radio module 213. As a result, only a single cellular telephone connection is needed, between the base station and the VRS control center, in embodiments of the present invention.

Another advantage of the present invention is that in many conventional systems, the roving mobile position determination units typically have only a radio receiver. In embodiments of the present invention, radio module 223 is a radio transceiver that can send satellite data to, and receive satellite data from, base station 210. In the past a radio transceiver was not used in roving mobile position determination units because of size, weight, and power consumption issues. However, radio transceiver modules are currently available having the issues. However, radio transceiver modules are currently available having the same physical package as previous radio receiver modules and only draw a half watt of power when transmitting. As a result, the present invention can utilize a radio transceiver in the mobile position determination unit (e.g., mobile position determination unit 220 of FIGS. 2A, 2B, and 2C) without any significant increase in size or weight. Thus, two-way communications links can be established in the field between base station 210 and a plurality of mobile position determination units 220 without incurring additional cellular telephone charges realized in conventional VRS systems.

In one embodiment, radio modules 213 and 223 operate in the UHF spectrum in the range of approximately 450-470 MHz. In another embodiment, radio modules 213 and 223 operate in the VHF spectrum in the range of approximately 150-170 MHz. In yet another-embodiment, radio modules 213 and 223 are spread spectrum transceivers and operate in the range of approximately 900 MHz. While the present embodiments recite these frequency ranges specifically, embodiments of the present invention are well suited to operate in other frequency ranges as well, for example, in unlicensed bands such as 2.4 GHz under Part 15 of the FCC Rules (see CFR 47).

An additional advantage of the present invention is that base station 210 can be also used as a roving mobile position determination unit after the VRS base station has determined a more accurate position for the designated VRS location, which is initial location of the base station. For example, referring again to FIG. 2A, the base station may comprise a GPS module, a Bluetooth module, a radio module, and a cellular telephone module. After receiving the pseudorange data and pseudorange corrections from VRS control center 310 and determining its current position, base station 210 can be moved to a second position within region 340 and used as a roving unit in a manner similar to mobile position determination unit 220. As long as the base station stays within a given radius (e.g., within region 340 of FIG. 3) of that designated location (e.g., location 330 of FIG. 3), the pseudorange correction data received can be correlated with subsequent position fixes. In such an implementation, base station 210 and mobile position determination unit 220 can both be used as mobile position determination units. In conventional RTK systems, the GPS unit used to transmit the position correction must remain in a fixed position above a known, surveyed position. As a result, one GPS unit is unavailable for use as a roving surveying unit.

Figure 4:
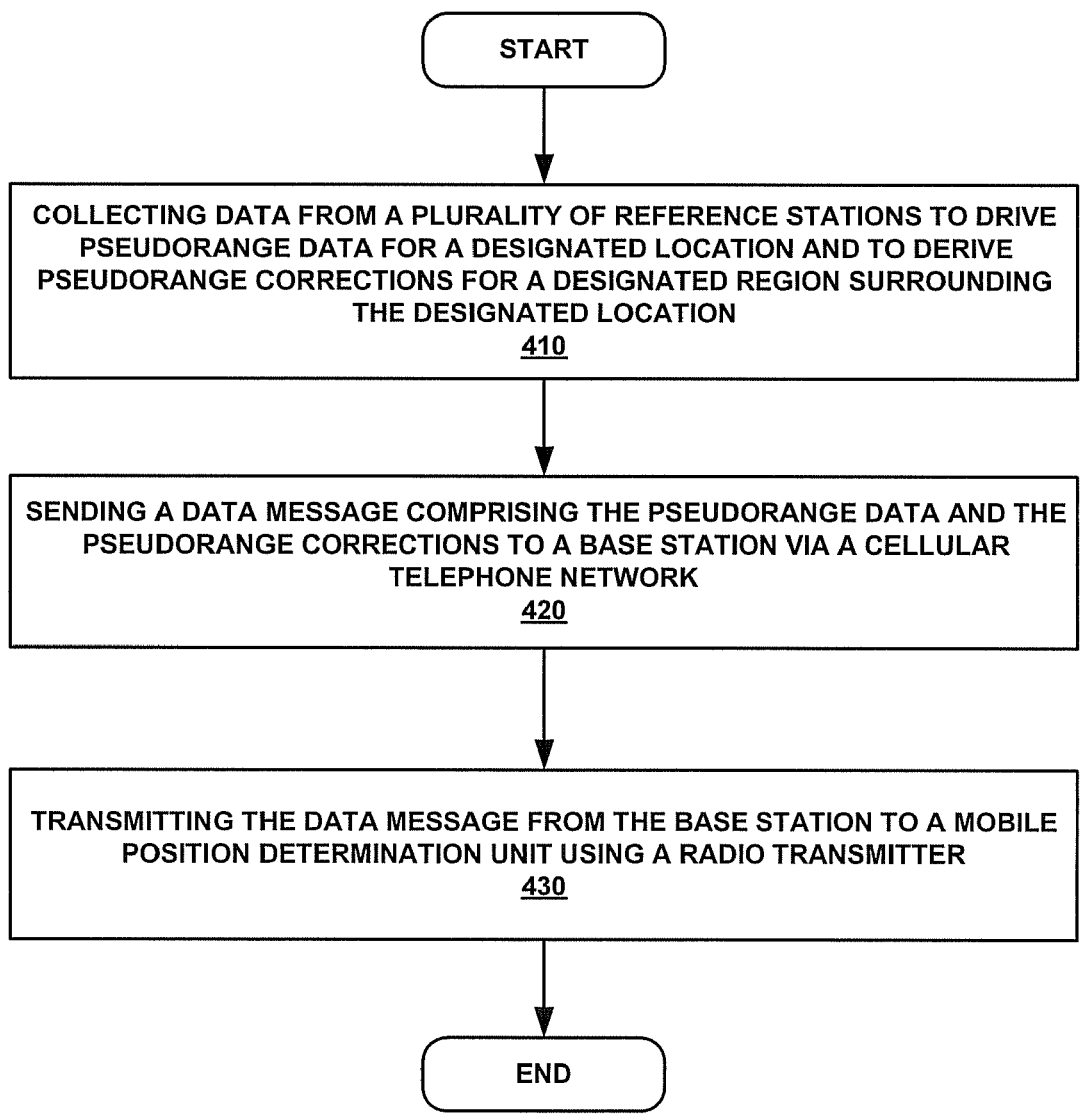
FIG. 4 is a flowchart of a method for delivering Virtual Reference Station data in accordance with embodiments of the present invention.

FIG. 4 is a flowchart of a method 400 for delivering Virtual Reference Station data in accordance with an embodiment of the present invention. In step 410 of FIG. 4, data is collected from a plurality of reference stations (e.g., reference stations 321-328 of FIG. 3) to derive pseudorange data for a designated location (e.g., location 330 of FIG. 3) and to derive pseudorange corrections for a designated region surrounding the designated location (e.g., region 340 of FIG. 3).

In step 420 of FIG. 4, a data message, comprising the pseudorange data and the pseudorange corrections, is send to a base station (e.g., base station 210 of FIGS. 2A, 2B, and 2C). As described above, the pseudorange data and pseudorange corrections are sent from VRS control center 310 to base station 210 using cellular network 360. The pseudorange data and pseudorange corrections can be used to determine the location of base station 210 and/or mobile position determination units 220 with a greater resolution than is achieved using an un-aided GPS position fix.

In step 430 of FIG. 4, the data message is transmitted from the base station to a mobile position determination unit (e.g., mobile position determination unit 220 of FIGS. 2A, 2B, and 2C) using a radio transmitter (e.g., radio module 213 of FIGS. 2A, 2B, and 2C). expected pseudorange at the VRS base station and the pseudorange corrections are used by the mobile position determination units, along with data received from the satellites, to determine the geographic position of the rover, again relative to the precise position of the VRS. As described above, while mobile position determination unit 220 is within a designated region surrounding designated location 330, the expected pseudorange at the VRS (e.g., base station 210 located at designated location 330) and the pseudorange corrections are used to more accurately determine the present position of the mobile position determination unit. For example, referring again to FIG. 3, a first measurement of mobile position determination unit 220 is made. This measurement is then corrected using the pseudorange corrections to more accurately determine the geographic position of mobile position determination unit 220. When mobile position determination unit 220 is moved to a second position, a second measurement of its position is made. As long as mobile position determination unit 220 is within a given radius of base station 210, the pseudorange data and pseudorange corrections sent by VRS control center 310 can be processed with this second position measurement to obtain a more accurate position fix for mobile position determination unit 220.

Figure 5A:
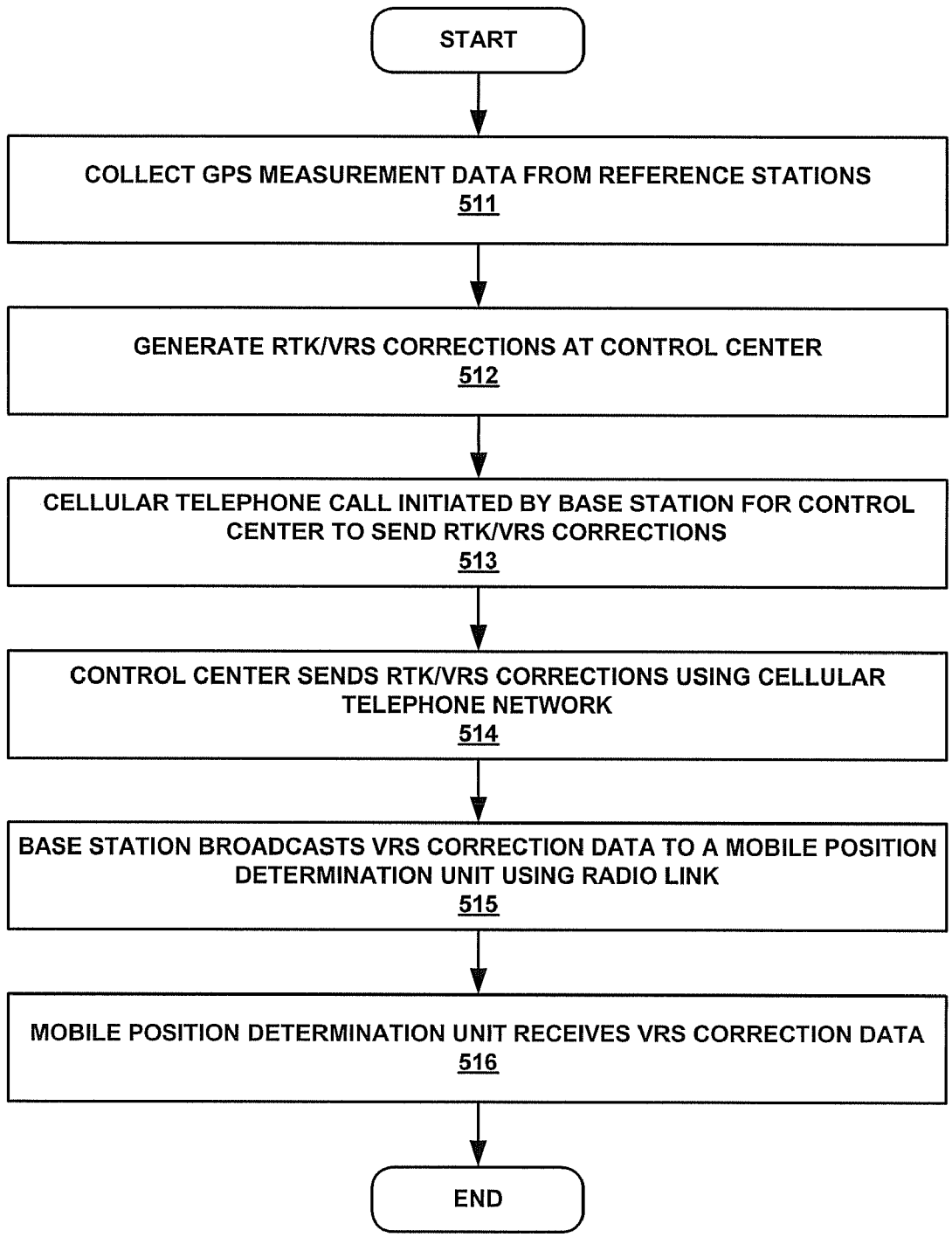
FIGS. 5A, 5B, and 5C are flow charts of methods for delivering Virtual Reference Station data in accordance with embodiments of the present invention.
Figure 5B:
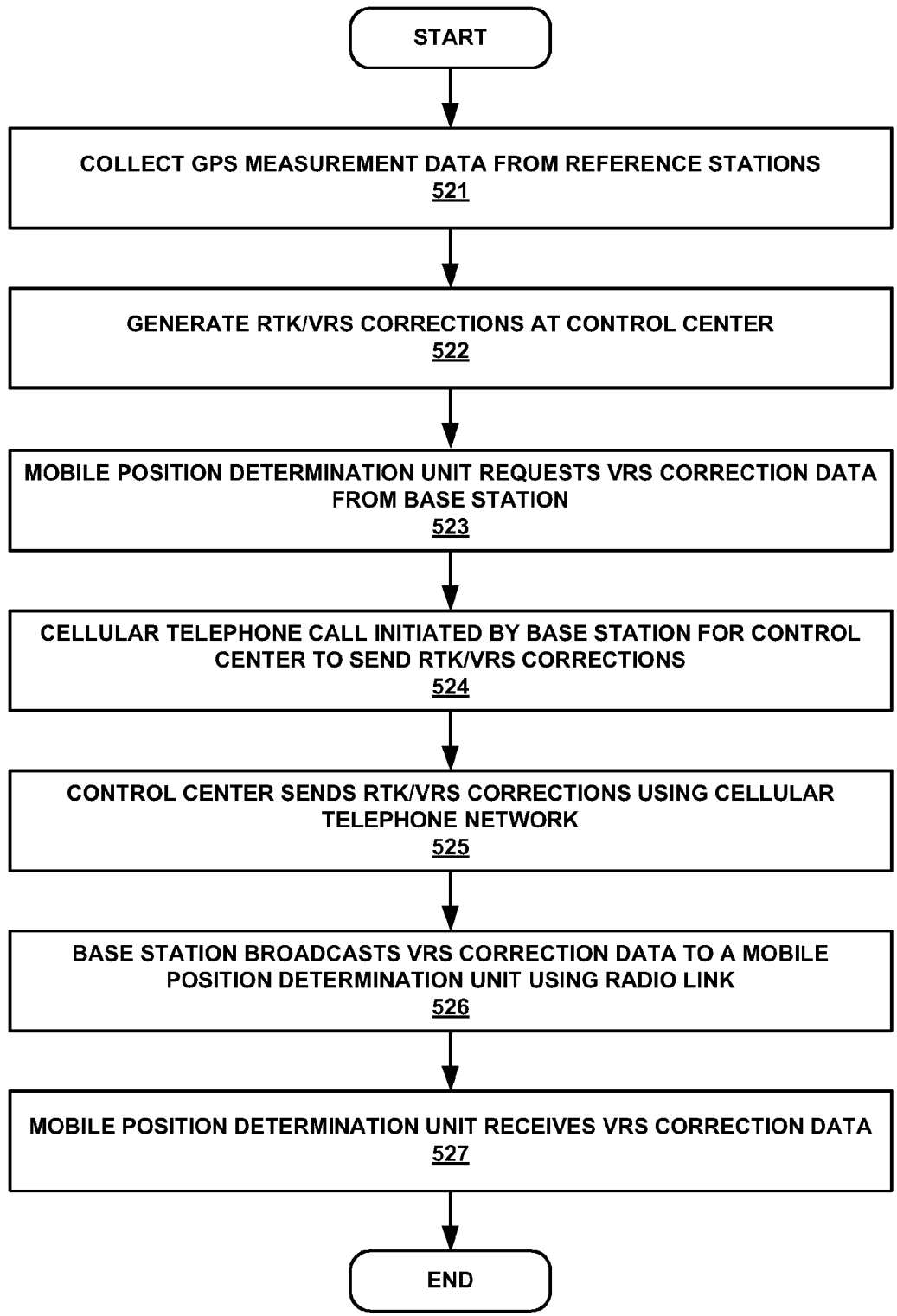
Figure 5C:
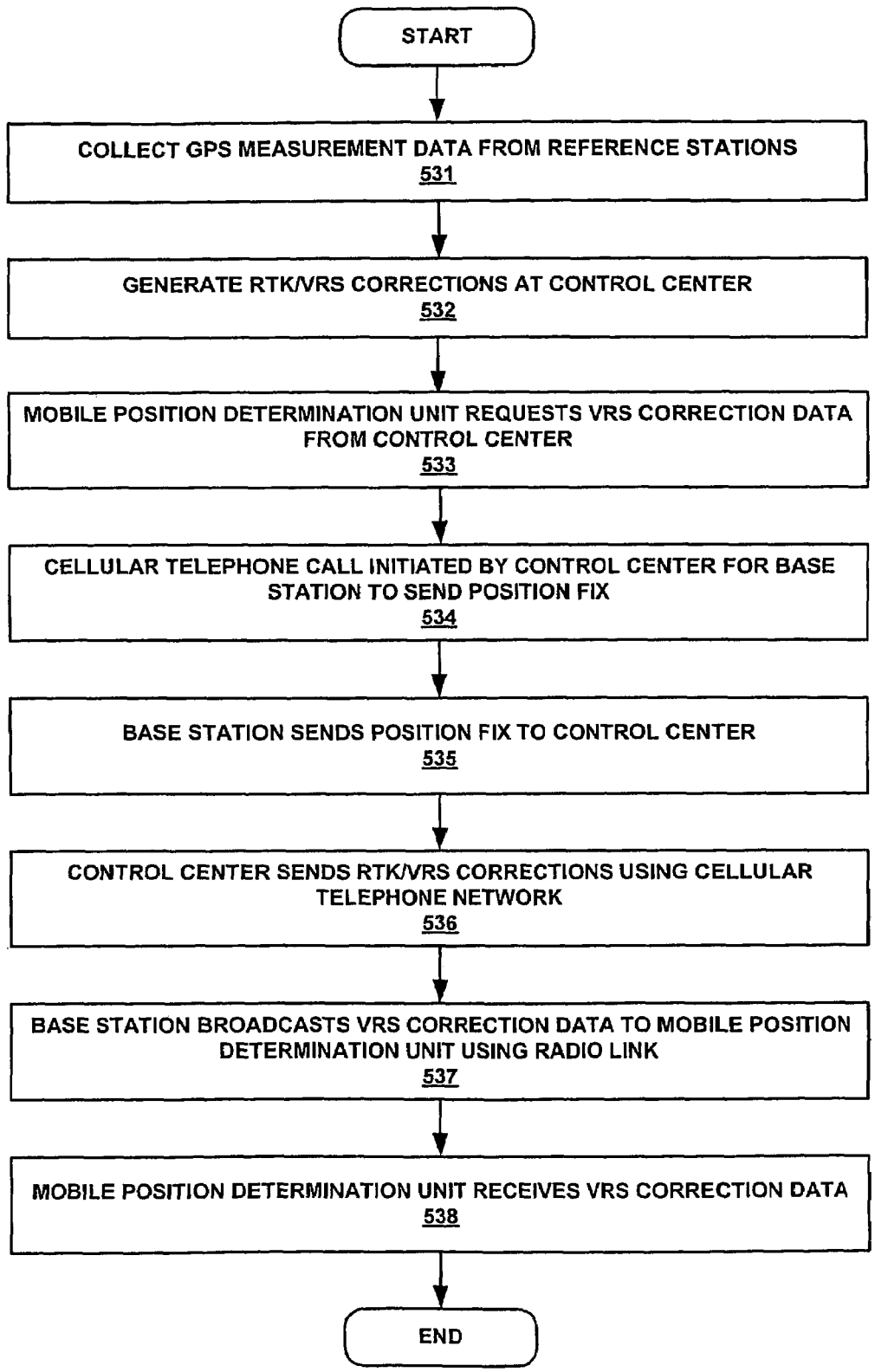

FIGS. 5A, 5B, and 5C are flow charts of methods for delivering Virtual Reference Station data in accordance with embodiments of the present invention. In step 511 of FIG. 5A, GPS measurement data is collected from a plurality of reference stations. As described above, VRS control center 310 utilizes GPS data from reference station 321-328 to determine the magnitude of errors affecting signals within the network coverage area.

In step 512 of FIG. 5A, RTK/VRS corrections are generated at a VRS control center. Using the data collected in step 511, VRS control center 310 generates RTK/VRS pseudorange corrections that can be used to determine a geographic position more precisely.

In step 513 of FIG. 5A, a cellular telephone call is initiated by a base station for the VRS control center to send RTK/VRS corrections. In embodiments of the present invention, base station 210 requests virtual reference station data for a designated location. In embodiments of the present invention, this request is conveyed using a cellular telephone connection. Typically, base station 210 sends an initial position fix to VRS control center 310 so that pseudorange data for that designated location can be generated.

In step 514 of FIG. 5A, the VRS control center sends RTK/VRS corrections using a cellular telephone network. In embodiments of the present invention, VRS control center 310 will then generate pseudorange data for a designated location (e.g., location 330 of FIG. 3) for base station 210 and pseudorange corrections for the designated region surrounding base station 210 (e.g., region 340 of FIG. 3). In embodiments of the present invention, the pseudorange data and pseudorange corrections are sent to base station 210 via cellular network 360.

In step 515 of FIG. 5A, the base station broadcasts VRS correction data to a mobile position determination unit using a radio link. In embodiments of the present invention, base station 210 broadcasts the pseudorange data and pseudorange corrections to mobile position determination unit 220 using, for example, radio module 213 or Bluetooth module 212.

In step 516 of FIG. 5A, the mobile position determination unit receives the VRS correction data. In embodiments of the present invention, mobile position determination unit 220 receives the pseudorange data and pseudorange corrections using, for example, Bluetooth module 222 or radio module 223. The mobile position determination unit then uses the pseudorange data and pseudorange corrections to more precisely determine its present location.

Referring now to FIG. 5B, in step 521, GPS measurement data is collected from a plurality of reference stations. As described above, VRS control center 310 utilizes GPS data from reference station 321-328 to determine the magnitude of errors affecting signals within the network coverage area.

In step 522 of FIG. 5B, RTK/VRS corrections are generated at a VRS control center. Using the data collected in step 521, VRS control center 310 generates RTK/VRS pseudorange corrections that can be used to determine a geographic position more precisely.

In step 523 of FIG. 5B, a mobile position determination unit requests VRS correction data from a base station. In embodiments of the present invention, mobile position determination unit 220 initiates generating VRS correction data by sending a message to base station 210 requesting VRS correction data.

In step 524 of FIG. 5B, a cellular telephone call is initiated by a base station for the VRS control center to send RTK/VRS corrections. In response to the message from mobile position determination unit 220, base station 210 contacts VRS control center 310 via cellular network 360 and requests VRS correction data.

In step 525 of FIG. 5B, the VRS control center sends RTK/VRS corrections using a cellular telephone network. In embodiments of the present invention, VRS control center 310 will then generate pseudorange data for a designated location (e.g., location 330 of FIG. 3) for base station 210 and pseudorange corrections for the designated region surrounding base station 210 (e.g., region 340 of FIG. 3). In embodiments of the present invention, the pseudorange data and pseudorange corrections are sent to base station 210 via cellular network 360.

In step 526 of FIG. 5B, the base station broadcasts VRS correction data to the mobile position determination unit using a radio link. In embodiments of the present invention, base station 210 broadcasts the pseudorange data and pseudorange corrections to mobile position determination unit 220 using, for example, radio module 213 or Bluetooth module 212.

In step 527 of FIG. 5B, the mobile position determination unit receives the VRS correction data. In embodiments of the present invention, mobile position determination unit 220 receives the pseudorange data and pseudorange corrections using, for example, Bluetooth module 222 or radio module 223. The mobile position determination unit then uses the pseudorange data and pseudorange corrections to more precisely determine its present location.

Referring now to FIG. 5C, in step 531, GPS measurement data is collected from a plurality of reference stations. As described above, VRS control center 310 utilizes GPS data from reference station 321-328 to determine the magnitude of errors affecting signals within the network coverage area.

In step 532 of FIG. 5C, RTK/VRS corrections are generated at a VRS control center. Using the data collected in step 531, VRS control center 310 generates RTK/VRS pseudorange corrections that can be used to determine a geographic position more precisely.

In step 533 of FIG. 5C, a mobile position determination unit requests VRS correction data from the VRS control center. In embodiments of the present invention, a request for VRS correction data is conveyed from the mobile position determination unit directly to the VRS control center. For example, a user may initiate a cellular telephone call using optional cellular telephone module 224 (e.g., a cellular telephone) by calling VRS control center 310 directly. The user could then indicate a particular base station in the network for VRS control center 310 to contact. Upon indicating which base station to contact, the user can terminate the cellular connection with VRS base station 310 because the VRS data will be sent from base station 210 to the mobile position determination unit using a radio transmitter.

In step 534 of FIG. 5C, the VRS control center initiates a cellular telephone connection with the base station and requests a position fix. VRS control center 310 then contacts base station 210 and requests an initial position fix of its current location. Using this information, VRS control center 310 can then generate pseudorange data for base station 210 and pseudorange corrections for the designated region surrounding base station 210.

In step 535 of FIG. 5C, the base station sends a position fix to the VRS control center. Base station 210 then determines an initial position fix of its current location using, for example, GPS module 211 or GPS module 221. This initial position fix is then sent to VRS control center 310 via cellular network 360.

In step 536 of FIG. 5C, the control center sends RTK/VRS corrections using a cellular telephone network. In embodiments of the present invention, VRS control center 310 Will then generate pseudorange data for a designated location (e.g., location 330 of FIG. 3) for base station 210 and pseudorange corrections for the designated region surrounding base station 210 (e.g., region 340 of FIG. 3). In embodiments of the present invention, the pseudorange data and pseudorange corrections are sent to base station 210 via cellular network 360.

In step 537 of FIG. 5C, the base station broadcasts VRS correction data to the mobile position determination unit using a radio link. In embodiments of the present invention, base station 210 broadcasts the pseudorange data and pseudorange corrections to mobile position determination unit 220 using, for example, radio module 213 or Bluetooth module 212.

In step 538 of FIG. 5C, the mobile position determination unit receives the VRS correction data. In embodiments of the present invention, mobile position determination unit 220 receives the pseudorange data and pseudorange corrections using, for example, Bluetooth module 222 or radio module 223. The mobile position determination unit then uses the pseudorange data and pseudorange corrections to more precisely determine its present location.

The preferred embodiment of the present invention, a method and system for determining a geographic position, is thus described. While the present invention has been described in particular embodiments, it should be appreciated that the present invention should not be construed as limited by such embodiments, but rather construed according to the following claims.

What is claimed is:

1. A method for delivering Virtual Reference Station (VRS) data derived by a VRS network processor at a VRS control station for a designated location to a mobile position determination unit with a terrestrial communications link, said method comprising:
    creating a data message comprising pseudorange data derived for said designated location and pseudorange corrections for a designated region surrounding said designated location;
    sending said data message via a cellular telephone connection from said VRS control station to a moveable Real Time Kinematics (RTK) base station located in the designated region surrounding said designated location; and
    transmitting said data message from said moveable RTK base station to a mobile position determination unit using a radio transmitter independent of said cellular telephone connection, wherein said moveable RTK base station may be moved about within said designated region while performing said transmitting.

2. The method as recited in claim 1 wherein said VRS control center receives a request for said Virtual Reference Station data and further comprising:
    deriving the pseudorange data and the pseudorange corrections in response to receiving said request.

3. The method as recited in claim 2 further comprising:
    receiving said request from said moveable RTK base station.

4. The method as recited in claim 3 further comprising:
    initiating said request in response to receiving a message from said mobile position determination unit.

5. The method as recited in claim 2 further comprising:
    receiving said request from said mobile position determination unit;
    establishing said cellular telephone connection with said moveable RTK base station; and
    requesting a position fix of said designated location.

6. The method as recited in claim 1 further comprising:
    utilizing a global positioning system (GPS) receiver to determine a position fix of said designated location.

7. The method as recited in claim 6 wherein said GPS receiver is disposed in said mobile position determination unit and wherein said method further comprises:
    locating said mobile position determination unit proximate to said moveable RTK base station; and
    utilizing said mobile position determination unit to determine and position fix.

8. The method as recited in claim 6 wherein said method further comprises:
    communicatively coupling said radio transmitter with a cellular communications device.

9. The method as recited in claim 8 wherein said radio transmitter comprises a Bluetooth communications device, and wherein said method further comprises:
    sending said data message to said mobile position determination unit using said Bluetooth communications device.

10. The method as recited in claim 1 wherein said transmitting comprises selecting a frequency from a group of frequency ranges consisting of 150 MHz-170 MHz and 450 MHz-470 MHz.

11. A system for delivering Virtual Reference Station (VRS) data comprising:
- a VRS control center for creating a data message comprising pseudorange data derived for a designated location and pseudorange corrections for a designated region surrounding said designated location;
- a moveable Real Time Kinematics (RTK) base station located in said designated region surrounding said designated location, said moveable RTK base station for receiving said data message from said VRS control center via a cellular telephone connection and for transmitting said data message using a radio transmitter independent of said cellular telephone connection, wherein said moveable RTK base station may be moved about within said designated region while transmitting said data message; and
- a mobile position determination unit for receiving said data message from said moveable RTK base station.

12. The system of claim 11, wherein said VRS control center derives the pseudorange data and the pseudorange corrections in response to a request for VRS data.

13. The system of claim 12 wherein said moveable RTK base station initiates said request.

14. The system of claim 13 wherein said moveable RTK base station initiates said request in response to a message from said mobile position determination unit.

15. The system of claim 12 wherein VRS control center receives said request from said mobile position determination unit and establishes said cellular telephone connection with said moveable RTK base station to request a position fix of said designated location.

16. The system of claim 11 further comprising:
- a Global Positioning System (GPS) receiver for determining a position fix of said designated location.

17. The system of claim 16 wherein said GPS receiver is disposed in said position determination unit.

18. The system of claim 16 wherein said radio transmitter is communicatively coupled with a cellular telephone device.

19. The system of claim 18 wherein said radio transmitter comprises a Bluetooth communications device.

20. The system of claim 11 wherein said radio transmitter transmits said data message at a frequency selected from a group of frequency ranges consisting of 150 MHz-170 MHz and 450 MHz-470 MHz.

21. A method for delivering Virtual Reference Station (VRS) data comprising:
- collecting data from a plurality of reference stations to derive pseudorange data for a designated location and to derive pseudorange corrections for a designated region surrounding said designated location;
- sending a data message comprising the pseudorange data and the pseudorange corrections to a moveable Real Time Kinematics (RTK) base station via a cellular telephone network, and wherein said moveable RTK base station is located in said designed region surrounding said designated location; and
- transmitting said data message from said moveable RTK base station to a mobile position determination unit located in said designated region surrounding said designated location using a radio transmitter independent of said cellular telephone network, wherein said moveable RTK base station may be moved about within said designated region while performing said transmitting.

22. The method as recited in claim 21 wherein said VRS control center receives a request for said Virtual Reference Station data and further comprising:
- deriving said pseudorange data and said pseudorange corrections in response to receiving said request.

23. The method as recited in claim 22 further comprising:
- receiving said request from said moveable RTK base station.

24. The method as recited in claim 23 further comprising:
- initiating said request in response to receiving a message from said mobile position determination unit.

25. The method as recited in claim 22 further comprising:
- receiving said request from said mobile position determination unit;
- establishing said cellular telephone connection with said moveable RTK base station; and
- requesting a position fix of said designated location.

26. The method as recited in claim 21 further comprising:
- utilizing a global positioning system (GPS) receiver to determine a position fix of said designated location.

27. The method as recited in claim 26 wherein said GPS receiver is disposed in said mobile position determination unit and wherein said method further comprises:
- locating said mobile position determination unit proximate to said moveable RTK base station; and
- utilizing said mobile position determination unit to determine said position fix.

28. The method as recited in claim 26 wherein said method further comprises:
- communicatively coupling said radio transmitter with a cellular communications device.

29. The method as recited in claim 28 wherein said radio transmitter comprises a Bluetooth communications device, and wherein said method further comprises:
- sending said data message to said mobile position determination unit using said Bluetooth communications device.

30. The method as recited in claim 21 wherein said transmitting comprises selecting a frequency from a group of frequency ranges consisting of 150 MHz-170 MHz and 450 MHz-470 MHz.

* * * * *